United States Patent [19]

Bhardwaj

[11] Patent Number: 4,963,378

[45] Date of Patent: Oct. 16, 1990

[54] METHOD OF COOKING INVOLVING HIGH PROTEIN FRYING BATTER THAT ELIMINATES THE NEED FOR BREADING AND PRODUCES CRISPY AND CHEWY CRUST

[76] Inventor: Satish C. Bhardwaj, 1365 W. 7th St., #6H, Brooklyn, N.Y. 11204

[21] Appl. No.: 410,840

[22] Filed: Sep. 22, 1989

Related U.S. Application Data

[63] Continuation-in-part of Ser. No. 229,296, Aug. 8, 1988, abandoned.

[51] Int. Cl.$^5$ .............................................. H23L 1/01
[52] U.S. Cl. ..................... 426/302; 426/303; 426/438
[58] Field of Search ............... 426/302, 303, 305, 309, 426/549, 273, 293, 438

[56] References Cited

U.S. PATENT DOCUMENTS

| | | | |
|---|---|---|---|
| 3,052,545 | 9/1962 | Ducharme et al. | 426/549 |
| 3,956,515 | 5/1976 | Moore et al. | 426/302 |
| 3,976,798 | 8/1976 | Young et al. | 426/303 |
| 4,054,673 | 10/1977 | Kaufman | 426/302 |
| 4,140,803 | 2/1979 | Panchuk et al. | 426/93 |
| 4,142,001 | 2/1979 | Kilpatrick | 426/302 |
| 4,174,408 | 11/1979 | Wesselski et al. | 426/302 |
| 4,330,566 | 5/1982 | Meyer et al. | 426/293 |
| 4,342,788 | 8/1982 | Claffelter | 426/438 |
| 4,465,696 | 8/1984 | Strahl | 426/302 |
| 4,504,509 | 3/1985 | Bell et al. | 426/549 |
| 4,518,620 | 5/1985 | Monagle et al. | 426/293 |
| 4,529,607 | 7/1985 | Lenchin et al. | 426/549 |

OTHER PUBLICATIONS

Processed Plant Protein Foodstuffs, Altschul, pp. 215-216, 718-719, Academic Press, Inc., New York, 1958.
Starch Chemistry and Technology, Whistler et al., pp. 233, Academic Press, Inc., New York, Second Edition, 1984.

*Primary Examiner*—Donald E. Czaja
*Assistant Examiner*—Drew S. Workman

[57] ABSTRACT

High quality fried food pieces having crispy and chewy crusts with high protein are obtained without the addition of Protein Isolates when all kinds of food pieces are dipped in a batter containing, as essential ingredient, highly swollen particles created by dispersing, in an aqueous liquid at room temperature, protein rich washed Moong Dal ground to particle sizes varying from 100 Microns to 1400 Microns and deep frying. By varying the texture of the ground Moong Dal and varying the batter consistency, batter suitable for coating fish or boneless chicken or for coating beef, pork or chicken with bones can be obtained.

9 Claims, No Drawings

METHOD OF COOKING INVOLVING HIGH PROTEIN FRYING BATTER THAT ELIMINATES THE NEED FOR BREADING AND PRODUCES CRISPY AND CHEWY CRUST

This application is a new continuation-in-part of the application Ser. No. 229,296 Aug. 8, 1988 now abandoned.

BACKGROUND OF THE INVENTION

High quality fried food pieces having crispy and chewy crusts with high protein are obtained without the addition of Protein isolates when all kinds of food pieces are dipped in a better containing, as an essential ingredient, highly swollen particles created by dispersing, in an aqueous liquid at room temperature, protein rich washed Moong Dal ground to particle sizes varying from 100 Microns to 1400 Microns.

The major purpose of dipping of food piece into a batter is to prevent their dehydration and absorbing oil and becoming greased during the process of deep frying and to provide a crispy and chewy crust. If the batter is not capable of providing enough water to provide for the water lost during deep frying, water, first, is provided by the food piece and, then, by the batter coating to cause both the crust and the food piece to become excessively dry.

The essential ingredients of the conventional batters are flours such as wheat, corn, rice, barley, peas etc to which are added ingredients such as milk/butter/-margerine, eggs, egg whites, egg yolk, tomatoes etc. which do nothing to improve the adhesive or other necessary properties of the batter as discussed in the previous paragraph.

The conventional batters do the job they are intended to do as listed previously poorly. A host of batters have been developed to correct the deficiencies in conventional and or other patented batters. These patented batters may be classified into four broad categories. Into the first category fall batters that are simply designed to ease their manufacture. For example, according to Wesselski et al whose invention was granted a U.S. Pat. No. 4,174,408, simply adjusting the proportion of the farinaceous ingredients in a conventional batter and prepacking them in a dry state so that they can be mixed with water when needed offers distinct advantages to the industry. Ironically, several years earlier Tressler found problem with this batter in that the batter mix causes the batter coating to get dried during deep frying. According to Tressler et al., U.S. Pat. No. 2,623,825, adding 1% to 2% of Tomatoes and apples puree extract to nearly the batter mix patented several years later cures the problem of dry crusts. Incidentally in the second category fall this class of batters that cure dryness of the crust during deep frying by adjusting the proportions of the batter ingredients.

Into the third category fall the inventions that donot try to improve the conventional batters at all but try to cure the dryness of the crust by cutting the frying time. According to Hanson et. al, U.S. Pat. No. 3,169,069, the problem of dry crusts can be solved by partially cooking chicken prior to dipping into conventional batter and deep frying. Several years later, Lenchin et al. was granted a U.S. Pat. No. 4,529,607 for proposing that food pieces be dipped in conventional batter but deep fried only until partially cooked and then microwaved.

Into the fourth category fall scores of inventions that claim to have solved the problem of dry crusts by partially or wholly replacing the raw, untreated starch flours in the conventional batters by Cold water swelling starches or pregelled starches. Cold water swelling starches are prepared by modifying granular starches with chemical reagents to provide a granular, modified food starch which will swell and readily disperse in water at temperatures of less than 120 degrees centigrade. These cold water starches have been invented by several inventors who have been granted Patents by U.S. Patents and Trademarks office. For example Kesler et al., Neukom with two patents each, Harris et al. Tuschhoff et al. and Hanson et al. have been granted U.S. Pat. Nos. 2,516,634, 2,845,417, 2,865,762, 2,884,412, 3,070,594, 3,705,891 and 3,725,386 respectively.

Pregelled starches are prepared by heating an aqueous starch slurry to a temperature above the gelation point of the starch. The gelation point of the starch is the temperature above which the starch granule will swell and burst. Fischer et al., according to U.S. Pat. No. 3,723,137 dipped a prewetted food piece in a pregelled starch and then in an aqueous liquid to create a batter coated product. In U.S. Pat. No. 3,235,385 granted to Cull 7% pregelled starches are added to a mixture of sodium chloride—44.5%, Sodium bicarbonate—22.2%, buttermilk—18.5to 18.7% and either tetrasodium pyrophosphate—7.4% or monocalcium phosphate 3.7% to create a batter that does not have any raw starch and Sodium chloride and puffing agents form over 74% of the batter. Such a batter would create a crust that is very unpleasant to the tongue and very bad for the heart, not to mention the frying oil which would become spoiled after just one frying.

According to U.S. Pat. No. 3,956,515 granted to Moore et al., 1 to 40 parts of cold water starch are added to 200 parts of raw untreated starch granules which have a gelation point of more than 125 degrees Fahrenheit and the mixture dispersed in water below 120 degrees Fahrenheit to create what Moore et al. term "batter system containing unswollen starch granules uniformly dispersed within an adhesive matrix of highly swollen, non-birefringent hydrated starch granules"—See "last sentence" of Moore abstract. Which means that Moore finds problems, which are discussed in Cols. 3-9 of Moore Specifications to which reference is made at this time, if percentage of swelling ingredient by weight of non-swelling ingredient falls outside the 0.5% -20% range.

Notwithstanding the arts of the foregoing and a host of other inventions art has not yet been developed to prevent the coating on food pieces dipped in the batter of those arts from getting dried and falling apart in large chunks after being frozen for being consumed at a later date. The cause for this problem is the excessive dehydration of the crust due to evaporation during the process of deep frying rather than the lack of adequate adhesion of the batter as alluded to by Moore et al. That Hansen et al. and Lenchn et al. prevent this problem by reducing the frying time, former by partially cooking the food pieces dipped in conventional batter and the latter by partially deep frying the food pieces dipped in conventional batter followed by microwaving, proves the previous statement. It is therefore an important object of the invention to provide a method of cooking that will make use of a batter whose ingredient or ingredients can absorb larger quantities of water than by ingredients in conventional batters, whose ingredients will need no chemical and thermal modification and which will present no problems if 100% of its ingredients get highly swollen when dispersed in an aqueous liquid.

Furthermore, the foregoing arts are not suitable for all kinds foods. Chicken with bones, beef and pork require thicker highly viscous batter coating containing relatively larger particles and boneless chicken; fish shrimp and vegetables require a relatively thinner batter containing smaller particles. It is yet another object of this invention to provide a relatively simple method of deep frying that creates a chewy and crispy crust and which is applicable to all kinds of foods.

Until now it is necessary to adjust the proportions of starches with amylose and amylopectin contents to achieve a desired color, taste or texture—See Line 52, Col. 5 —Line 11, Col. 6 Moore Specifications. It is an important object of this invention to provide a method of cooking that involves dipping in a batter which needs just one "essential" raw ingredient to create a batter coating of desired texture. The term "essential" is used herein to mean that the batter is complete except for spices and preservatives without the addition of any other ingredients. However, optional ingredients such as any and all starch and legume flours, any and all other non-starch, non-legume ingredients now being used in the conventional batters will not interfere with the essential ingredient and may be added. But the weight of the essential ingredient, in no case, should become less than 25% of the weight of all the solid ingredients used in making the batter of the invention.

The batter fried foods have crusts that have no nutritional value except for carbohydrates. Of course protein isolates have been developed and patented. Some of them could be quite unsuitable for use in the batters due to cooking involved in their preparation which causes them to loose their adhesion. In any case adding isolates isn't the same as using protein rich ingredient. It is, therefore, desirable and an object of this invention to provide a high protein ingredient that can partially or wholly replace the starch ingredients of the conventional batters.

In the past the problem of dry crusts have been solved by the addition of sodium bicarbonates, tetrasodium pyrophosphate or monocalcium phosphate to the extent of 30% of the solid ingredients of the batter to create a puffed up and soft-like-bread crust. It is desirable to have a method of deep frying that does not rely upon puffing agents such as those listed herein. It is therefore an object of this invention to provide a method of deep frying that can prevent dehydration of crust without the addition of puffing agents.

If one looks at the list of the ingredients on the boxes of the fried batter coated products being sold in the market one will find that to thicken the batter gaur gum is being added. It is an important object of the invention to provide a method of deep frying that relies on a batter that can be thickened sufficiently without the addition of gaur gum.

Final object of this invention is to achieve a crust of golden brown color without the addition of artificial colors.

These and other objects, advantages and features of this invention can be seen from a discussion of its specifications and appended claims.

DESCRIPTION OF THE PREFERRED EMBODIMENTS

According to this invention superior batter coated fried products are made if the starch flours components of the conventional batters are wholly or partially replaced by "washed Moong Dal" created from "Moong Beans" by splitting them and removing the outer skins in a well known process that does not require subjecting them to a superheated steam having a temperature of up to 150 degrees centigrade as against the boiling point of water of 100 degrees centigrade and which method of skin removal does not require the slurrying of green Moong beans prior to the removal of the skins. Washed Moong Dal is ground to a desired texture varying from fine granulated texture in which the particle sizes are as small as 100 Microns to a coarse granulated texture in which the particles are no longer than 1400 Microns. Ground washed Moong Dal is dispersed in sufficient quantity of an aqueous liquid to create a batter of consistency substantially capable of coating food pieces. The batter is set aside for at least 10 minutes or for a longer period of time under refrigerated conditions for the ground washed Moong Dal to absorb water. The food pieces are dipped in the batter after spices and preservatives are added to the batter and deep fried to produce delicious food pieces coated with high protein crispy and chewy crust. The batter of this invention is unique and novel in that the essential ingredient of the batter of this invention is washed Moong Dal which has been ground to particle sizes in the 100 Microns—1400 Microns range. Such a ground granulated material has been shown by the tests 1 through 6 listed below to absorb three times the amount of water absorbed by the ingredients of the conventional batters and hence of other patented batters which consist essentially of starch flours. Even washed Moong Dal, which swells to twice its volume when soaked to saturation, looses its ability to absorb water when the granular structure is destroyed by grinding it into flour.

The batter described in the previous paragraph is complete and no other ingredients are needed, except for spices and preservatives, to produce fried batter coated food pieces with high protein, crispy and chewy golden brown crust of highest quality. Obviously the best batter coated fried pieces are obtained when the batter of the invention contains only washed Moong Dal ground to 100 Microns—1400 Microns size range. But enough extra water is absorbed by the washed Moong DAl ground to the said size range when its amount is reduced, by the addition of optional ingredients such as any and all starch flours, any and all legume flours, milk/, cream/, yogurt/, buttermilk/, whey, eggs/, egg whites/, egg yolks, tomatoes or any other edible products so that the percentage of washed ground Moong Dal by weight is not less than 25% of the weight of all the solid ingredients used. When these optional ingredients are added in the indicated proportion, the crispness and chewyness of the fried batter coated food pieces is not appreciably affected. The aqueous liquids used in dispersing the batter ingredients may include, without limitation, water, milk/, cream/, buttermilk/, whey.

As an alternate embodiment, the food pieces may be dipped in spiced or unspiced mashed potatoes or dehydrated potatoes before being dipped in the batter of the preferred embodiment.

TEST 1

One cup of washed Moong Dal was soaked, in water at room temperature, to saturation and extra water drained. The volume of the soaked Moong Dal was found to be 2¼ cups.

TEST 2

One cup of washed Moong Dal ground to a grind in which particle sizes range from 100 Microns to 300 Microns was dispersed in one cup of water at room temperture. The consistency was found to be very thin (would not stick to a spoon handle. Within minutes all the water was absorbed). The cup was turned upside down and the batter did not fall. Additional ½ cup of water was added and stirred thoroughly. The consistency was found to be thin as before. After one hour most of the water had again been absorbed. The batter was scooped on to a dish. The batter stayed in a mound shape.

TEST 3

The above test was repeated with Washed Moong Dal ground to a grind in which particle sizes vary from 700 Microns to 1400 Microns Exactly the same results as in Test 2. No difference.

TEST 4

One cup of "washed Moong flour" was dispersed in one cup of water. A very thin consistency was observed which stayed the same for hours. The batter would not stick to a spoon handle.

TEST 5

This time two cups of washed Moong flour were dispersed in one cup of water at room temperature. Still the consistency was found to be very thin. The consistency stayed the same for hours. One additional cup of washed Moong Dal flour was added and the batter thoroughly mixed. The consistency observed was the same that was observed after minutes of adding one cup of water in Tests 2 and 3 so that the cup could be turned upside down without the batter falling out. Thus 3 cups of Moong flour vs one cup of ground Moong Dal in which particles were in 100 Microns–1400 Microns size range were needed for every cup of water to create the same pasty consistency.

CONCLUSION:

The washed Moong Dal has swelling and water absorbing properties that are destroyed when the granular texture of ground washed Moong Dal is destroyed by converting it into flour.

TEST 6

½ cup each of Wheat flour, corn flour, barley flour, oat flour, rice flour, chick peas flour and washed Moong Dal flour were mixed together. Test 5 was repeated by substituting 2 cups of the said mix for the "washed Moong Dal" flour. It was found as in test 5 to have produced very thin consistency which stayed the same for hours. One more cup of the said mix was needed to create the pasty consistency to turn the bowl upside down. Thus 3 cups of the flour mix was needed versus 1 cup of ground Moong Dal for every cup of water to achieve the same pasty texture. Conclusion: Washed Moong Dal ground to a texture having particle sizes in the range of 100-1400 Microns absorbs three times as much as flours.

Having shown that granulated ground washed Moong Dal absorbs as much as three times the water absorbed by flours, I will now illustrate my invention by the following examples:

Example 1

One cup of washed Moong Dal ground to a grind having particles in 100–300 Microns size range were dispersed in 1.75 cups of water at the room temperature which happened to be 80 degrees Fahrenheit, mixed with salt and spices and set aside for 10 minutes. Spiced cut up boneless chicken pieces were dipped in the said batter which contained highly swollen particles of granulated ground washed Moong Dal and deep fried until golden brown. The said fried pieces were found to have smooth thin crispy and chewy crust of very high quality.

Example 2

One cup of washed Moong Dal ground to a regular grind having particles in 100-1400 Microns size range was dispersed in 1½ cups of water at the room temperature of 80 degrees Fahrenheit, spiced and set aside for one hour in refrigerator. Previously, chicken legs were prepared by making several cuts in them to drain away the juices and refrigerated. The chicken legs spiced, dipped in the highly viscous batter containing highly swollen granulated ground washed Moong Dal particles, partially fried, cooled for five minutes and fried again until the crust was golden brown. The crust was found to have crystalline, crispy and chewy crust of very high and unmatched quality.

Example 3

A batter mix was created by adding two cups washed Dal ground to a grind with particles sizes given in Example 1, ½ cup wheat flour, ½ cup rice flour, ½ cup corn flour, ½ cup barley flour, ¼ cup dehydrated milk. One cup of this batter mix was dispersed in ¼ cup of water at the room temperature that happened to be 80 degrees fahrenheit on the day of this test. The batter was spiced and set aside for one hour. The batter was found to have highly swollen Moong Dal particles uniformly dispersed in the less viscous batter than the batter of previous two examples. Shrimps labled as large by supermarket were spiced, dipped in the batter deep fried in very hot oil until partially cooked, taken out of oil cooled for five minutes and deep fried until golden brown.

The crust was found to be smooth, crispy and chewy and of very high quality.

Having described the invention, shown the batter to be consisting of highly swollen ground Moong Dal particles and illustrated the invention by three examples, I now claim my invention as follows:

1. A method of cooking food pieces comprising dipping the food pieces in a batter created by grinding the washed Moong Dal to a desired texture varying from fine granulated texture in which the particles are larger than 100 Microns to a coarse granulated texture in which the particles are smaller than 1400 Microns, dispersing the said ground washed Moong Dal in sufficient aqueous liquids to create a batter consistency varying from thin consistency to thick consistency and deep frying the said dipped food pieces in hot oil until the crust is golden brown, to produce a fried batter coated food piece of superior quality having a crispy and chewy crust.

2. A method of cooking wherein a food piece is dipped in a batter created according to claim 1 wherein starch flours, legume flours, milk, cream, buttermilk, whey, eggs, egg whites, egg yolks, dehydrated potatoes or mashed potatoes, dehydrated onions, tomatoes, spices, preservatives or mixtures thereof are added to the said batter with the condition that the weight of the ground washed Moong Dal with granulated texture shall never become less than 25% of the weight of all the solid ingredients in the resulting batter.

3. A method of cooking wherein a food piece is dipped in a batter created according to claim 2 wherein dispersing in sufficient acqueous liquids comprises dispersing in a volume of aqueous liquids that equal 100% to 200% of the volume of all the batter solids.

4. A method of cooking wherein a food piece is dipped in mashed potatoes before being dipped in a batter created according to claim 1.

5. A method of cooking wherein a food piece is dipped in mashed potatoes before being dipped in a batter created according to claim 2.

6. A method of cooking wherein a food piece is dipped in mashed potatoes before being dipped in batter created according to claim 3.

7. A method of cooking according to claim 1 wherein the food piece is a piece of chicken with bones in which several cuts are made to drain the juices inside.

8. A method of cooking according to claim 2 wherein the food piece is a piece of chicken with bones in which several cuts are made to drain the juices inside.

9. A method of cooking according to claim 3 wherein the food piece is a piece of chicken with bones in which several cuts are made to drain the juices inside.

* * * * *